United States Patent

[11] 3,601,367

| [72] | Inventor | Chester J. Brown, Jr. Toledo, Ohio |
|---|---|---|
| [21] | Appl. No. | 859,304 |
| [22] | Filed | Sept. 19, 1969 |
| [45] | Patented | Aug. 24, 1971 |
| [73] | Assignee | Libbey-Owens-Ford Company Toledo, Ohio |

[54] MIXING GLASS BATCH MATERIALS
6 Claims, 4 Drawing Figs.

[52] U.S. Cl. .................................................. 259/1 R,
65/27, 259/3
[51] Int. Cl. ..................................................... B01f 9/10,
B01f 15/00
[50] Field of Search ........................................... 259/1-3,
11-47, 84, 174, 90

[56] References Cited
UNITED STATES PATENTS

| 3,134,576 | 5/1964 | Lodige et al. ................. | 259/21 |
| 3,214,145 | 10/1965 | Brown .......................... | 259/84 X |

*Primary Examiner*—William I. Price
*Attorney*—Collins and Oberlin

ABSTRACT: The invention pertains to a method of and apparatus for minimizing dust and moisture losses to dust collection systems from the hood of horizontal pan type glass batch mixing apparatus. A butterfly valve interposed in the exhaust port between the hood and the dust collector is selectively opened and closed in conjunction with the mixing cycle. The wafer of the butterfly valve contains a plurality of openings having sufficient area to prevent pressure buildup within the mixing chamber due to the heating and consequent expansion of the air therein, but effectively closing off the exhaust port between the mixing chamber and the dust collection system during both the dry and wet mixing stages.

INVENTOR.
Chester S. Brown, Jr.
BY
Collins & Oberlin
ATTORNEYS

MIXING GLASS BATCH MATERIALS

BACKGROUND OF THE INVENTION

1. Field of the Invention

The present invention relates to the intermixing of separate glass batch ingredients and the addition and distribution of a liquid medium throughout the intermixed ingredients. More particularly, it pertains to minimizing the loss of portions of the batch ingredients and moisture from the mixing apparatus through the dust collection system associated therewith. The invention applies to the general class of solid-state, countercurrent mixers characterized by a shallow, horizontal pan which revolves about a vertical axis and has mounted therein a plurality of mixing tools likewise adapted to rotate about vertical axes with means for admitting a liquid medium to the pan and a stationary hood mounted over the mixing pan to prevent the escape of dust from the system during mixing.

2. Description of the Prior Art

In the continuous production of sheet or plate glass, raw materials such as sand, limestone and soda ash, along with lesser amounts of other ingredients, are intermixed in accurately controlled predetermined proportions and charged into the melting end of a tank furnace. Production of glass of consistently high quality requires that the combined ingredients, or so-called batch, be thoroughly mixed to achieve a highly homogeneous state, and that this homogeneous state be maintained until the batch is melted and becomes an integral part of the molten mass within the tank. Even where a high degree of homogeneity is obtained during dry mixing, the respective components exhibit a tendency to segregate according to particle size, composition, and density during subsequent handling and furnace feeding operations, and even during movement within the furnace up until such time as the materials are melted and integrated into the molten mass. It has been found that the addition of a small amount of a liquid medium, such as water, to the dry batch materials in accurately controlled amounts will greatly reduce, if not eliminate, both the segregation of batch materials during handling and movement within the furnace prior to melting, and the well known problem of "dusting" wherein fine particles of the batch ingredients are carried off by the turbulent atmosphere of the furnace chamber and subsequently deposited in the checkerwork of the regenerators or upon the surface of the molten glass.

Briefly, in the typical batch mixing cycle a predetermined amount of each separate ingredient is initially accurately weighted in the dry state, and the ingredients are then charged into the mixing pan and vigorously mixed in a dry state by the action of the mixer. The liquid medium is thereafter added, with mixing continuing until the desired homogeneity and moisture distribution are achieved, and the batch is then discharged from the mixing apparatus.

In prior art mixers of this type, the seal at the peripheral interface between the rotating mixing pan and the dust hood is essentially airtight so long as pressure does not buildup within the mixing chamber. The system is vented to the atmosphere through one or more exhaust ports in the roof of the dust hood, with the port openings located on the centerline of adjacent corresponding inlets to a dust collector system and separated therefrom by a narrow gap.

During the charging operation a large volume of air (up to 5 or more cubic feet per second) is displaced from the chamber of the mixing apparatus, necessitating a port area of sufficient capacity to vent this volume without significant pressure buildup within the apparatus. Once the dry ingredients are charged, however, the port area need only vent the relatively small amount of air displaced by the expansion of the contained volume due to the temperature rise during mixing. The rapid charging of the dry materials causes the atmosphere volume within the apparatus to become heavily laden with fine dust particles and, moreover, large amounts of dust are continually being generated due to the vigorous intermixing of the ingredients during the dry mixing portion of the mixing cycle. With the subsequent addition of the liquid medium, the generation of dust decreases but the atmosphere becomes saturated with moisture vapor.

A significant problem experienced with the prior art structures involves the loss of substantial amounts of batch ingredients and moisture vapor to the dust collection system through the open exhaust ports. The average particle size varies along the several batch ingredients, and those ingredients of a smaller size are lost in far greater amounts than those of a larger size. Also, the total amount of both moisture and granular ingredients lost varies widely from batch to batch. The effect of this phenomenon is to produce significant composition changes which negate the quality control advantages gained by the precision weighing of the batch ingredients.

SUMMARY

By the present invention, the loss of fine particles and moisture from the glass batch mixing apparatus to the dust collection system is significantly reduced, allowing the desired degree of quality control obtainable through the proportioning of the dry ingredients by precision weighing prior to charging same into the mixing apparatus, and the addition of a predetermined amount of moisture thereto, to be maintained throughout the mixing cycle. This is accomplished by providing each exhaust port with a movable gate, commonly known as a "butterfly valve," to control the amount of port area open to the dust collection system. The valve contains a plurality of openings, and is operated sequentially with the mixing cycle so that it is fully open during the charging of the dry ingredients, when large amounts of air must be displaced from the mixing apparatus, and thereafter is closed, remaining closed throughout the balance of the mixing cycle with the openings providing sufficient escape area to offset atmosphere expansion within the apparatus due to the heat generated by the mixing therein.

It is, therefore, a primary object of the present invention to provide an improved vent system for horizontal pan type mixers.

Another object of the invention is to provide an improved method of and apparatus for minimizing the loss of batch ingredients and moisture from a glass batch mixer.

Still another object of the invention is to substantially close off the atmosphere within the mixer during the mixing cycle while venting sufficient atmosphere to prevent any pressure buildup and consequently to minimize loss of ingredients and moisture therefrom.

Other objects and advantages of the invention will become more apparent during the course of the following description when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENTS

Although the present invention will be described with particular reference to its use in minimizing loss of ingredients and moisture vapor from a glass batch mixing apparatus, it will be understood that the invention is adaptable to other uses and is not limited to the mixing of any particular materials.

Figure 1:
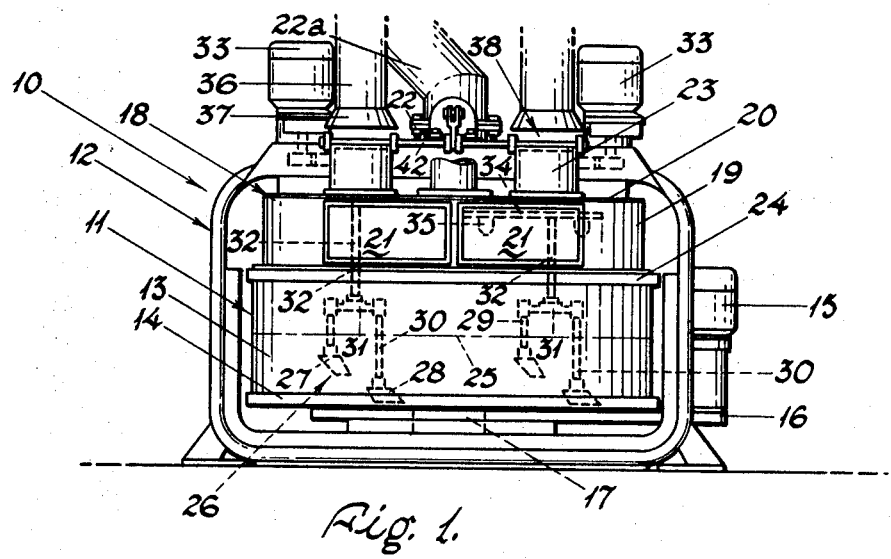
FIG. 1 is a side elevation of the apparatus of the invention with the mixing tools and spray system shown in broken lines.

Referring now to the drawings, and in particular to FIG. 1 thereof, there is shown generally at 10 a countercurrent type mixer comprising a cylindrical mixing pan 11 adapted to rotate about a vertical axis within a supporting framework 12. The mixing pan 11 has a cylindrical wall 13 and a floor 14 and is driven by a motor 15 through suitable gearing at 16. Located in the floor 14 is an orifice 17 closed by a gate (not shown) through which the mixed batch is discharged into a hopper car or other suitable conveying means for transfer to a melting furnace.

Mounted above the rotating mixing pan is a stationary dust hood 18 comprising a cylindrical sidewall 19 and a cover plate 20. Within the cylindrical sidewall are located access doors 21. The cover plate contains an opening 22 (FIG. 2) through which batch materials are admitted as from a duct 22a having a suitable gate therein (not shown) which may be the bottom of a storage hopper, and cylindrical exhaust ports 23. As best shown in FIG. 3, the cylindrical exhaust ports are mounted above corresponding congruent openings in the cover plate, and are thus fully open to the chamber of the hood 18. The peripheral interface 24 between the pan 11 and the hood 18 is gasketed in any conventional manner to form an essentially airtight seal. The access doors 21 are also fitted with gaskets to achieve a tight closure.

Both the gate and the duct 22a and the gate of circular discharge orifice 17 may be opened and closed by well-known electropneumatic or other suitable means which may be operated manually, but are preferably automatically actuated by the conventional mechanism which controls the sequential function of the mixer.

The mixing pan 11 and dust hood 18 define a chamber wherein the normal charge of batch ingredients occupies the volume below the line indicated at 25 (FIG. 1). A pair of mixing paddles or stars 26 located within the rotating pan 11, each having upper mixing shovels 27 and lower mixing shovels 28 mounted angularly on upper mixing shovel shaft 29 and lower mixing shovel shafts 30, respectively. The shafts are fixed to mixing arms 31 which, in turn, are fixed to rotating drive shafts 32, each of which is independently driven by a motor 33 connected to a gear reduction unit (not shown). As the shafts 32 rotate, the angular mounting of the shovels 27 and 28 causes them to simultaneously raise the batch materials and displace them laterally both at the lower and upper levels. During mixing the paddles 26 rotate in a direction opposite that of the pan 11, producing an efficient countercurrent mixing effect.

A spray system 34 (FIG. 1) having nozzles 35 is positioned in the hood above the mixing paddles. The nozzles define a downwardly directed spray pattern which distributes a predetermined amount of liquid only the surface of the batch materials. This system is also controlled by the mechanism which sequentially controls the mixer.

A pair of dust collector intake ducts 36 with inlet cones 37 is positioned just above and concentric with the exhaust ports 23 and separated therefrom by an air gap 38.

Pivotally mounted within each exhaust port 23 is a butterfly valve 39, comprising a wafer disc 40 containing a plurality of openings 41 (FIG. 4) which may be ordinary drilled holes. The disc is rigidly mounted on a shaft 42 which, in turn, is mounted for rotation within stationary bearing supports 43 (FIGS. 2 and 4).

The size and number of the openings 41 must be such as to provide sufficient area to exhaust an amount of air equal to the volume expansion created by the heat resulting from mixing and wetting of the batch without a buildup of pressure within the chamber. At the same time, the size of the individual openings should be kept small enough so that air currents are not set up within the chamber by the entrainment resulting from negative pressure at the dust collector inlets 37.

For a 3,000 liter (approximately 106 cubic feet) capacity mixer, successful optimization has been achieved using butterfly valves having disc measuring 15½ inches in diameter, each disc containing a pattern of 11 holes one-half inch in diameter.

Figure 2:
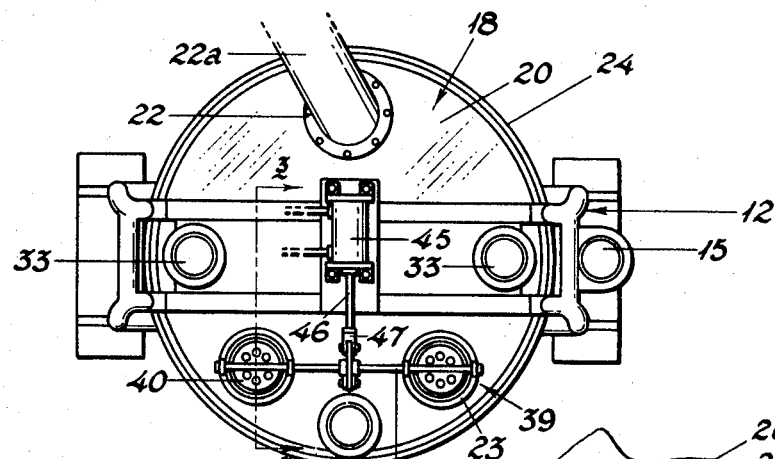
FIG. 2 is a plan view of the apparatus showing the location of the vent ports.
Figures 3, 4:
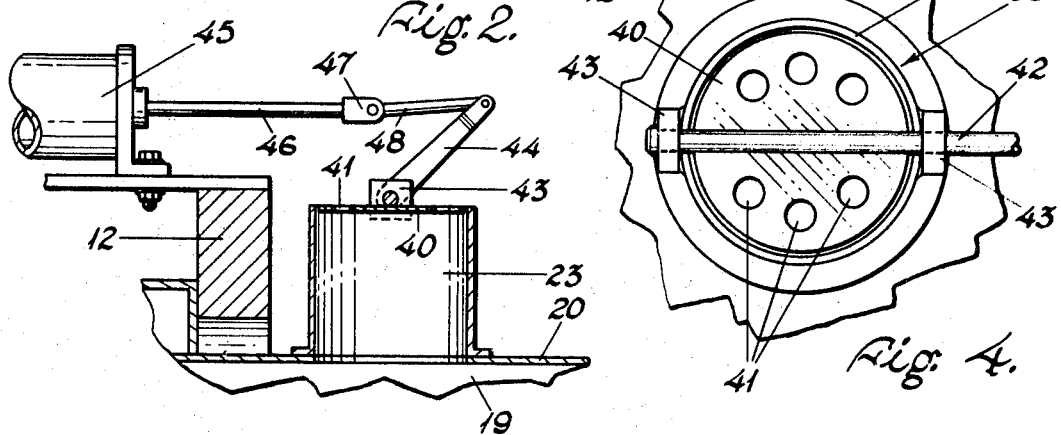
FIG. 3 is an enlarged fragmentary elevational view, partially in section, of a vent port of the invention showing the butterfly valve and actuating means therefore.
FIG. 4 is an enlarged fragmentary plan view of a port as shown in FIG. 2.

As best shown in FIGS. 2 and 3, the two valves 39 are operated simultaneously by a single operating handle 44 attached to the ends of both of the shafts 42 at a point midway between the exhaust valves 39. The handle 44 is actuated by means of a single air cylinder 45 supported from the frame 12 above the dust hood 18. The cylinder rod 46 is connected to the handle 44 through a clevis 47 and connecting rod 48, whereby the stroking of the air cylinder 44 will rotate the shafts 42 to open and close the exhaust valves 39. Although the preferred embodiment shows the operating means to be a single air cylinder connected to a single operating handle, it is readily observed that other comparable means may easily be substituted therefor.

The operation of the air cylinder 45 may be manual but is preferably automatic and sequentially integrated in the mixer cycle.

The automatically controlled mixer operating cycle begins with the mixer empty, pan 11 and mixing paddles 26 off and discharge orifice 17, access doors 21, the gate in duct 22a and exhaust ports 23 closed. Butterfly valves 39 in the exhaust ports 23 are then opened, exposing the mixer chamber to full exhaust in order to accommodate the air displaced in charging the batch ingredients. The gate in duct 22a is then opened to admit the batch ingredients in accurately predetermined proportions and is closed immediately thereafter, followed closely by the full closure of the butterfly valves 39. The batch is then mixed for a predetermined period in the dry state with the pan 11 and paddles 25 rotating and vigorously intermixing the ingredients. At the end of the dry mixing and, with the pan and paddles continuing to rotate, the spray system 34 distributed enough water directly onto the batch to bring the moisture content of the batch up the desired level. Wet mixing continues for a predetermined interval, at the conclusion of which the discharge orifice 17 opens and the mixing paddles rapidly propel the mixed batch therethrough.

Throughout the mixing and discharge portions of the cycle the butterfly valves 39 in exhaust ports 23 remain fully closed, the openings 41 in the wafer discs 40 thereof accommodating the passage of sufficient air to maintain substantially atmospheric pressure within the mixing chamber. Immediately after the mixed batch is discharged, the rotation of the mixer pan and paddles ceases, orifice 17 is again closed and the mixer is ready to begin the next cycle.

From the foregoing, it is believed apparent that the present invention contemplates an improved method and apparatus for preparing glass batch so as to substantially reduce dust and moisture losses during mixing to thereby preserve the quality control achieved by precision measuring of the ingredients prior to mixing.

I claim:

1. In a method of preparing glass batch ingredients for charging into a melting furnace wherein the individual batch ingredients are charged into a substantially enclosed mixer in a dry state, partially intermixed in the dry state, a predetermined amount of liquid is added, and mixing continues until the batch is substantially homogeneous with the liquid uniformly distributed therethrough, the improvement comprising the steps of venting the enclosed mixer to allow free escape of displaced atmosphere during charging of the batch ingredients into said mixer, and thereafter partially closing off the avenue of escape of said atmosphere during the remainder of the mixing cycle to minimize loss of batch material and moisture from said mixer while preventing a buildup of pressure within said mixer due to the temperature increase therein during mixing.

2. A method of preparing glass batch ingredients as claimed in claim 1, wherein said enclosed mixer is simultaneously vented at a plurality of points.

3. An apparatus for preparing glass batch ingredients for charging into a melting furnace, including a substantially enclosed mixer for receiving predetermined quantities of glass batch ingredients and intermixing said ingredients in response to rotation thereof, the improvement comprising an exhaust port in communication with said enclosed mixer, with means in said exhaust port movable from an open position whereat substantially the full area of said exhaust port is provided for passage of atmosphere displaced from said mixer as said batch ingredients are received therein to a closed position whereat a predetermined portion of said full area is available for passage of atmosphere from said mixer.

4. Apparatus for preparing glass batch ingredients for charging into a melting furnace as claimed in claim 3, wherein said mixer comprises a mixing pan adapted to rotate about a vertical axis and a stationary hood mounted above said pan and forming therewith the substantially enclosed mixing area, said exhaust port comprising a tubular member extending from an opening in said hood, and said movable means therein comprising a pivotally mounted valve plate.

5. Apparatus as claimed in claim 4, including a plurality of openings in said valve plate providing said predetermined portion of said full area available for passage of atmosphere with said valve plate in the closed position.

6. Apparatus as claimed in claim 5, including two of said exhaust portion in said head, the valve plates of said exhaust ports being pivotally mounted on axially aligned shafts, and means operably connected to said aligned shafts to open and close said valve plates simultaneously.

UNITED STATES PATENT OFFICE
CERTIFICATE OF CORRECTION

Patent No. 3,601,367          Dated Aug. 24, 1971

Inventor(s) Chester J. Brown, Jr.

It is certified that error appears in the above-identified patent and that said Letters Patent are hereby corrected as shown below:

Col. 1, line 50, cancel "weighted" and insert -- weighed --.
Col. 3, line 50, cancel "only" and insert -- onto --,
Col. 4, line 33, after "up" insert -- to --,
Col. 6, line 8, cancel "portion" and insert -- ports --.

Signed and sealed this 7th day of March 1972.

(SEAL)
Attest:

EDWARD M. FLETCHER, JR.          ROBERT GOTTSCHALK
Attesting Officer               Commissioner of Patents